(12) United States Patent
Kluge et al.

(10) Patent No.: US 9,091,560 B2
(45) Date of Patent: Jul. 28, 2015

(54) METHOD OF ESTIMATING AN ABILITY OF A VEHICLE TO REACH A TARGET ROAD SEGMENT, METHOD OF GENERATING A DATABASE, AND NAVIGATION SYSTEM

(71) Applicant: Harman Becker Automotive Systems GmbH, Karlsbad (DE)

(72) Inventors: Sebastian Kluge, Munich (DE); Hans-Peter Engelhardt, Unterschleissheim (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

(21) Appl. No.: 13/942,228

(22) Filed: Jul. 15, 2013

(65) Prior Publication Data
US 2014/0019041 A1 Jan. 16, 2014

(30) Foreign Application Priority Data
Jul. 13, 2012 (EP) .................................... 12176370

(51) Int. Cl.
*G01C 21/00* (2006.01)
*G08G 1/123* (2006.01)
*G01C 21/34* (2006.01)

(52) U.S. Cl.
CPC .................................. *G01C 21/3469* (2013.01)

(58) Field of Classification Search
CPC .................................................. G01C 21/3469
USPC ........................................ 701/430, 527, 533
See application file for complete search history.

(56) References Cited

U.S. PATENT DOCUMENTS

| 5,568,390 A | 10/1996 | Hirota et al. |
| 6,285,950 B1 | 9/2001 | Tanimoto |
| 2012/0136574 A1* | 5/2012 | Kobayashi et al. ........... 701/533 |

FOREIGN PATENT DOCUMENTS

| WO | 2011029562 | 3/2011 |
| WO | 2012065726 | 5/2012 |

OTHER PUBLICATIONS

Zhang et al., "Remaining driving range estimation of electric vehicle", Electric Vehicle Conference, 2012, pp. 1-7.

*Primary Examiner* — Calvin Cheung
*Assistant Examiner* — Paula L Schneider
(74) *Attorney, Agent, or Firm* — O'Shea Getz P.C.

(57) ABSTRACT

Various embodiments relate to a method of estimating an ability of a vehicle to reach a target road segment, comprising retrieving road segment data for road segments containing previously generated route information for routes connecting the road segments, the route information parameterizing costs associated for travelling along the respective route); and establishing first road segment data for the target road segment indicating a gateway road segment and indicating route information for a successive route from the gateway road segment to the target road segment. The method further comprises, based on the route information of the successive route, determining first costs for travelling along the successive route, and establishing, based on the indicated gateway road segment, second road segment data for the current road segment, the second road segment data indicating route information for an initial route from the current road segment to the gateway road segment. The method further comprises determining, based on the received route information for the initial route, second costs for travelling on the initial route and estimating, based on the determined first and second costs, the ability of the vehicle to reach the target road segment.

15 Claims, 9 Drawing Sheets

METHOD OF ESTIMATING AN ABILITY OF A VEHICLE TO REACH A TARGET ROAD SEGMENT, METHOD OF GENERATING A DATABASE, AND NAVIGATION SYSTEM

CLAIM OF PRIORITY

This patent application claims priority from EP Application No. 12 176 370.0 filed Jul. 13, 2012, which is hereby incorporated by reference.

FIELD OF TECHNOLOGY

Various embodiments relate to a method of estimating an ability of a vehicle to reach a target road segment, a method of generating a database for estimating a cruising range of the vehicle, and a navigation system. In particular, various embodiments relate to techniques for estimating a cruising range of the vehicle based on road segment data retrieved from the previously generated database.

RELATED ART

Navigation units in vehicles estimate a cruising range of the vehicle, i.e., determining the most remote geographical locations still being reachable by the vehicle given the available amount of resources, e.g., fuel or energy, or within a given maximum time. For example, for a cruising range relating to an amount of available energy/fuel cars powered by conventional fuel provide a comparably larger amount of energy storage and therefore are capable of travelling longer distances, i.e., have a comparable larger cruising range; while vehicles powered by alternative energies, such as hydrogen-powered cars or hybrid cars or electric cars, may have a comparably smaller cruising range. For such scenarios, a particularly accurate estimation of the cruising range can be desired in order to accurately predict whether a certain destination is reachable without refueling or to predict when refueling is necessary.

The cruising range of a vehicle is typically dependent on numerous different parameters which, in particular, may be subject to time-dependence. For example, the amount of available energy typically decreases with increasing travel time. Also, traffic conditions which influence the cruising range may dynamically change. For example, a traffic congestion may reduce the cruising range as the energy/fuel consumption increases. Also the present location of the vehicle may change over time, e.g., in an unexpected manner, thereby changing the cruising range. In other words, when the vehicle travels through a network of road segments, the set of all road segments which are reachable given certain energy resources may continuously change. Therefore, in order to provide an accurate cruising range at all times relying on the most up-to-date parameters, frequent updating of a previously estimated cruising range may be desirable.

Simple techniques estimate the cruising range solely based on the present amount of available energy/fuel and a pre-defined or measured fuel consumption, e.g., in the form of a moving average of the present fuel consumption. In particular, such techniques may be independent of the network of road segments in the vicinity of the vehicle. For example, such techniques may not take into account that on an upcoming highway the consumption may be reduced compared to a current value where the vehicle is, e.g., located in an urban area with high traffic volume and/or stop-and-go traffic.

More sophisticated approaches may take into account the network of road segments in the vicinity of the vehicle when estimating the cruising range. To do so, digital map data containing the network of the road segments typically can be used to perform a road network search. For example, the road network search may determine the shortest or fastest or most energy-efficient route or a combination thereof. The road network search may expand route links for the road segments given respective costs associated with the road segments. Various techniques may be used to perform the road network search, e.g., the Dijkstra algorithm, etc. to provide a route with minimized costs. Once such a route is obtained, the energy/fuel consumption costs can be determined based on information provided in the digital map data, such as length of the road segments, parameterized energy consumption costs associated with the expanded route links, etc. A comparably accurate estimating of the cruising range may be possible. However, such an estimating of the cruising range can be computationally expensive, i.e., require a large amount of computational resources; in particular, executing the road network search may require many iteration steps and occupy significant memory. Accordingly, there is a general desire to reduce the computational efforts needed to estimate the cruising range.

For example, WO 2011/029562 A1 discloses techniques for a cruising range calculation for a plurality of roads, wherein those roads are dividable into multiple hierarchy classes. The cruising ranges are calculated based on roads belonging to a first hierarchy class.

However, such techniques may suffer from certain limitations. For example, if only a faction of the entire network of road segments is considered for the estimating of the cruising range, the accuracy of the determined cruising range may be degraded. Typically, a trade-off between an accuracy of the estimating of the cruising range and the associated computational efforts may be necessary. In view of the estimated cruising range having a limited duration of validity as set forth above, a rate of updating of the cruising range may be limited, thereby reducing the accuracy. In particular, conventional techniques may frequently not take into account the high computational burden which is associated with a re-computation of the set of all reachable road segments of the network of road segments by full-scale execution of the road network search in the course of a cruising range update.

Therefore, a need exists to provide techniques which allow estimating and updating the cruising range of a vehicle in a computationally efficient manner at a high accuracy.

SUMMARY OF THE INVENTION

According to an aspect, a method of estimating an ability of a vehicle to reach a target road segment is provided. The method comprises retrieving digital map data comprising road segments in a vicinity of a current location of the vehicle, the digital map data comprising the target road segment. The method further comprises retrieving road segment data for at least some of the road segments from a database, the road segment data containing previously generated route information for routes connecting the road segments, the route information parameterizing costs for travelling along the respective route. The method further comprises establishing a current road segment based on a current location of the vehicle; and establishing, from the retrieved road segment data, first road segment data for the target road segment, the first road segment data indicating a gateway road segment and indicating the route information for a successive route from the gateway road segment to the target road segment. The method further comprises determining, based on the route information for the successive route, first costs for travelling on the successive route between the gateway road segment and the target road segment. The method further comprises establishing, based on the indicated gateway road segment, second road segment data for the current road segment, the second road segment data indicating route information for an initial route from the current road segment to the gateway road segment. The method further comprises determining, based on the route information for the initial route, second costs for travelling on the initial route. The method further comprises estimating, based on the determined first and second costs, the ability of the vehicle to reach the target road segment.

For example, the current location may be determined using a global positioning system (GPS) or a cellular network or vehicle odometry data, e.g., wheel turning or steering wheel angle, or an inertial navigation system. Different techniques are known to the skilled person.

For example, the digital map data may be retrieved from a map database. The digital map data may comprise, in other words, a network of the road segments. The road segments may be associated with a starting point of given geographical location (xy coordinates, e.g., latitude and longitude and/or geodetic and/or Cartesian coordinates) and an endpoint of given geographical location. The starting points and endpoints are also referred to as nodes. The digital map data may comprise further information on, e.g., landmarks, rivers, lakes, urban areas, region labels, countries, points of interest, gas stations, elevation of the terrain, a digital terrain model, etc. In particular, the digital map data may comprise energy consumption costs associated with the road segments.

The database for the road segment data may be implemented as a part of the map database or may be a separate database, e.g., on separate storage medium etc. In particular, the road segment data may be temporary data which depends on the present vicinity and the current location of the vehicle, i.e., may have a validity of minutes or hours, while the digital map data may be more persistent data, e.g., with a validity on the order of months or even years being dependent on the persistence of the network of road segments.

The second road segment data may be established from the retrieved road segment data. In an alternative embodiment, the establishing of the second road segment data may comprise performing a road network search to obtain the initial route from the current road segment to the gateway road segment and determining the route information for the initial route.

Techniques for the performing of the road network search and the determining of the route information are discussed below e.g., with respect to a method of generating the database according to a further aspect.

In other words, in one embodiment, the route information for the initial route may be pre-determined and readily retrieved from the road segment data in the database. However, it is also possible to determine the road segment data for the initial road when estimating the ability of the vehicle to reach the target road segment. The initial route extends from the current road segment to the gateway road segment. Typically, the initial route may not be very long. In particular, the maximum distance between the current road segment and the gateway road segment may be predefined and limited. Therefore, it may be possible, without the need of comparably large computational resources, to perform the road network search.

It should be understood that the retrieved road segment data may be linked or associated with the road segments of the digital map data. For example, the target road segment and the current road segment and the gateway road segment may be associated with the network of road segments of the digital map data and further may be associated with the respective route information of the road segment data. This may, in particular, allow the estimating of the ability of the vehicle to reach an arbitrary target road segment selected from the digital map data and/or the ability of the vehicle to reach an arbitrary current road segment which may be determined by a navigation system in a conventional manner By providing the route information for the routes as part of the road segment data, a fast and computationally inexpensive calculation of the first and second costs may be possible. A computationally expensive road network search to obtain the routes may be pre-performed at the time of the execution of a method of generating the database containing the road segment data. In other words, the computationally expensive step of generating the road segment data may be performed once, e.g., in a background process or directly after a vehicle start-up, such that the estimating of the ability of the vehicle to reach the target road segment based on the road segment data occupies comparably fewer resources and therefore may be repeatedly executed more often, e.g., during the driving of the vehicle. By such technique, a cruising range may be provided which is always up-to-date.

In principle, in a simple approach, it may be possible to perform the road network search for all road segments of the digital map data, i.e., to pre-generate routes and the respective road network data and route information between any two road segments. However, such an approach may be time consuming and occupy a large amount of computational resources.

To this respect, by providing the gateway road segments, the amount of road segment data to be pre-generated may be limited. Generally speaking, such a solution may be seen in the context of a "conquer-and-divide" approach, where the overall route between the current road segment and the target road segment is split up by the gateway road segment into the initial route and the successive route. To this respect, the gateway road segment may act as the connecting element between the initial and successive routes, i.e., the gateway road segments may be referred to a route connecting road segments For various locations in the vicinity of the current location of the vehicle, the route to reach the target road segment may always pass through one and the same gateway road segment and subsequently follow the successive route to reach the target location; differently, for various locations in the vicinity of the current location of the vehicle, the initial routes to reach this gateway road segment may all vary considerable. Namely, as the current location and with it the current road segment may be subject to frequent changes as the vehicle moves, the initial route may vary more often per time as the successive route which is more remote from the current location. For example, the local feeder roads may change frequently, while the longer distance routes remain the same.

This shall be illustrated by a non-limiting scenario: when a car moves through an urban area and the target road segment is located a few tens of kilometers away and outside the urban area, a large fraction of the entire route to reach the target road segment may be independent of the particular current location of the vehicle. For example, this fraction may relate to the road segments of, e.g., a highway towards the target road segment and the feeder and local roads between the highway exit and the target road segment. However, the local roads and feeder road between the current location and the highway entry may be subject to frequent changes with the current location. Taking this into account, the gateway road segments may encircle the current location of the vehicle at a given distance. The gateway road segments may be preferably located on higher hierarchy roads, i.e., roads corresponding to at least one of higher speed, higher capacity or higher through traffic; examples may be highways or freeways or arterial roads. Such high hierarchy roads are likely to be part of a route to the more remote target road segment. The number of gateway road segments may be limited; the limited number may arise from the structure of the network of road segments itself. For example, there may be a limited number of highways to and from the current location, i.e., in-between the current location and the target road segment. It may also be possible to limit the number of gateway road segments.

By providing the pre-generated route information for the successive routes and optionally for the initial routes, the route information parameterizing the costs to reach the target road segment passing through the gateway road segment, it may be possible to estimate the ability of the vehicle to reach the target road segment in a computationally efficient manner. In particular, it may be possible to determine the ability of the vehicle to reach the target road segment given the current location of the vehicle without having to execute an entire road network search. Namely, the road network search between the gateway road segments and the target road segments may be pre-performed, e.g., as part of a method of generating the database according to a further aspect discussed below; optionally the road network search between the road segments in the close vicinity of the current location and the gateway road segments may be pre-performed as well; however it should be understood that it is possible, according to various embodiments, to perform this road network search on-the-fly during the execution of the method of estimating the ability of the vehicle to reach the target road segment as currently discussed. Typically, as the gateway road segments are not situated far away from the current location, the road network search to provide the initial route on-the-fly may not be comparably computationally expensive. The route information may correspond to the output of the road network searches. The computational efforts to estimate the ability of the vehicle to reach the target road segment based on the parameterized costs for the routes may be significantly reduced if compared to full-scale execution of the road network search. Moreover, by providing the gateway road segments connecting the initial and successive routes, it may be possible to reduce the amount of road segment data and route information considerably, thereby saving memory and computational resources for the generating. It may only be necessary to provide a single route information between the more remote road segments and a selected one of the gateway road segments. Optionally, it may only be necessary to pre-generate and provide the route information for routes connecting the road segments in a close vicinity of the current location with all the gateway road segments.

The costs may parameterize energy consumption costs for travelling along the respective route or may parameterize travel time for travelling along the respective route or a combination thereof. In other words, the costs may parameterize travel time and/or travel distance and/or energy consumption for travelling along the respective route. It should be understood that respective costs may also be provided as part of the digital map data for the road segments and/or may be directly derivable therefrom. In particular, the routes to which the route information corresponds may be generated by a road network search yielding the route being optimized with respect to the costs. For example, the road network search may determine the shortest or fastest or most energy-efficient route. However, in general it may not be necessary that the routes are optimized with respect to the same type of costs as parameterized by the route information. For example, the route may be the shortest route, while the parameterized costs indicate an energy consumption necessary to travel along the route.

Parameterizing such costs may correspond to, in other words, providing parameters which can be used to derive the actual costs necessary for travelling along the associated route given the present driving situation, e.g., the current location, the current consumption, current traffic conditions, etc. In a simple embodiment, the route information may correspond to the actual costs, e.g., specify that it takes 35 minutes to travel along the respective route or that it takes 7 liters of fuel to travel along the respective route. In a further embodiment, the actual costs may be derived; e.g., the fuel consumption may be dependent on, both, the route (being static and the same for all users) and individual/vehicle-specific parameters such as the type of the vehicle, driving habits, a moving average of the energy consumption, time of the day (rush hours, night hour), weather conditions, number of passengers in the vehicle, etc. It may be possible to dynamically determine latter parameters and provide the static component of the total costs in the route information. The static component of the parameterized costs may relate to such parameters as road distances on road of different hierarchies, e.g., highways, local roads, feeder roads, etc., travel time along the route, travel distance along the route, air condition on/off, height difference, number of intersections along the route with and without traffic lights and/or with and without right of way, height difference with positive and/or negative inclination angle etc. In particular, a speed distribution and/or slope distribution and/or acceleration distribution may be contained as parameterized costs. For example, the speed distribution may contain histogram data of speed limits, e.g., state "10 km at 60 km/h; and 4 km at 100 km/h" and so forth. The acceleration may relate to the changes of the speed at intersections, etc. From all such parameters, either alone or in combination, the actual costs may be derived.

When the first and second costs are determined, it may be possible to estimate the ability of the vehicle to reach the target road segment from, e.g., a comparison of the sum of the first and second costs with a current amount of resources. In case the costs relate to travel time, a user may specify the amount of time he is willing to spend on travelling, e.g., 2 hours; then, in an illustrating scenario, it may be estimated whether the target road segment is reachable within 2 hours. In case the costs relate to energy consumption, sensors may be provided in the vehicle which allow determining a current amount of available energy/fuel. For example, the amount of energy available may relate to a charging level of batteries for powering electric cars, i.e., the state-of-charge, e.g., 44 kWh. For conventional fuel-driven cars, the amount of available energy may relate to a filling level of the fuel tank, e.g., 53 liters. For example, such information may be readily available on a data bus system of the vehicle, e.g., a CAN bus or a MOST bus.

In the method, establishing, from the retrieved road segment data, the first road segment data may comprise selecting the first road segment data from the retrieved road segment data based on the target road segment. Likewise, establishing, from the retrieved road segment data, the second road segment data may comprise selecting the second road segment data from the retrieved road segment data based on the gateway road segment.

In general, the method may comprise determining a current amount of resources and comparing the first and second costs with the current amount of resources. Then, if the costs necessary to reach the target road segments are higher (lower)

than the current amount of available energy, the target road segments may be estimated as being not reachable (reachable) by the vehicle.

According to an embodiment, a method of estimating a cruising range of a vehicle by updating a previously determined cruising range is provided. The method comprises retrieving road segment data of road segments from a database, the database containing previously generated route information for routes connecting the road segments. The method further comprises estimating the ability of the vehicle to reach a plurality of target road segments according to the method of estimating the ability of the vehicle to reach the target road segment of the respective aspect as set forth above. The plurality of target road segments are situated in a third geographical area, the third geographical area comprising the previously estimated cruising range and having inner and outer boundaries which are dependent on the previously estimated cruising range of a vehicle. The method further comprises estimating the cruising range of the vehicle based on the estimated ability of the vehicle to reach the plurality of target road segments.

In other words, when the ability of the vehicle to reach a target road segment is determined for a plurality of the target road segments, the cruising range may be derived from this information. The cruising range may be the geographical area containing the current location and having outer boundaries being defined by the ability of the vehicle to reach the road segments given the presently available amount of resources, e.g., energy/fuel or travel time.

For example, the ability of the vehicle to reach a road segment may be estimated for all road segments of the third geographical area. In another embodiment, the ability of the vehicle to reach a road segment may be estimated for all road segments of the third geographical area having a hierarchy class which is larger than a threshold hierarchy class. The third geographical area may be an area where the amount of available energy has been previously determined to run low, i.e., fall below a respective threshold. In particular, the third geographical area may extend beyond the previously estimated cruising range; this may allow to account for variations in the estimating corresponding to, both, an increasing and a decreasing cruising range. For example, it may be possible that due to certain changing parameters the presently estimated and updated cruising range extends further than the previously estimated cruising range. In order to accurately estimate the cruising range also for such conditions, it may be desired to have the third geographical area extending beyond the previously estimated cruising range to cover neighboring areas which are likely to be relevant for the updating of the cruising range.

To this respect, it may be possible that the method of estimating the cruising range further comprises determining the third geographical area having inner boundaries being defined by a lower threshold of costs associated with reaching the inner boundaries and having outer boundaries being defined by an upper threshold of costs associated with reaching the outer boundaries. For example, the cost may be derived from the previously estimated cruising range.

In such a way, it may be ensured that the ability of the vehicle to reach a target road segment is estimated for all those target road segments which are likely to form the boundary of the cruising range. However, at the same time estimating the ability of the vehicle to reach those target road segments which are unlikely to form the cruising range may be avoided. In such a way, the number of computational steps may be reduced, as the ability of the vehicle to reach a target road segment does not have to be estimated for all road segments of the digital map data.

It may also be possible that the third geographical area is indicated in the road segment data. For example, together with the previously estimated cruising range, it may be possible to store the third geographical area, e.g., by adding corresponding markers to those road segments in the database which are situated in the third geographical area.

In a further embodiment, it may be possible that the method of estimating the cruising range further comprises determining the third geographical area having inner boundaries being defined by a certain distance to the previously estimated cruising range and having outer boundaries being defined by a further certain distance to the previously estimated cruising range.

The method of estimating the cruising range may further comprise checking a validity of the database, the validity indicating whether the routes of the route information are outdated, wherein the checking is based on elements selected from the group consisting of: a distance between a current location at the time the database was generated and the current location; a distance between gateway road segments and the current location; a distance between a previously estimated cruising range and the estimated cruising range. The method may further comprise selectively generating a new database based on the checking of the validity.

The route information containing the initial and successive routes may have a limited duration of validity. The routes may be optimized with respect to the costs at the time the database was generated. However, the parameters entering the optimization may be subject to time-dependence. Furthermore, if the current location of the vehicle varies with the vehicle moving through the network of the road segments, at one point in time the initial parameters for the road network search may have changed substantially; in other words, if the routes were optimized with respect to certain costs, this optimization may at one point in time not hold true anymore.

For example, the database may be considered invalid if the distance between the vehicle location at the time the database was generated and the present current location is larger than a given threshold, e.g., when the vehicle has moved by such a distance that the optimization cannot be regarded as being still valid. In particular, initial routes may not or only to a limited degree be available. Likewise, the database may be considered invalid if the present distance between any one of the gateway road segments and the current location is smaller than a given threshold. Likewise, the database may be considered invalid if the distance between the previously estimated cruising range and the presently estimated cruising range is larger than a given threshold. In such cases, the database may be generated anew.

In particular, the new database may be generated in a background process and the cruising range may be estimated based on the database until the generating of the new database is completed. It may be possible to maintain a sufficient accuracy of the estimating of the cruising range at all times by early triggering of the selectively generating of the new database. Yet, by generating the new database in a background process, it may be possible to provide frequent updates of the cruising range at all times. The comparably inexpensive estimating of the cruising range can be performed in a foreground process, while the comparably expensive generating of the new database may be a background process.

According to a further aspect, a method of generating a database for estimating a cruising range of a vehicle is provided. The method comprises retrieving digital map data from a map database comprising road segments in a vicinity of a current location of the vehicle. The method further comprises determining, based on the digital map data, a first geographical area and a second geographical area, wherein the first geographical area is a connected area comprising the current location, and wherein the second geographical area surrounds the first geographical area. The method further comprises determining a plurality of gateway road segments based on their distance to the boundary between the first and second geographical areas; and for at least one road segment situated in the first geographical area, performing a road network search to obtain first routes from the respective road segments to each of the plurality of gateway road segments and buffering the obtained first routes as initial routes. The method further comprises, for each of the plurality of gateway road segments, continuing the road network search to obtain second routes from the plurality of gateway road segments to at least one road segment situated in the second geographical area. The method further comprises, for the at least one road segment situated in the second geographical area, buffering one of the obtained second routes as successive route, the successive route being the second route having minimized costs for travelling between any one of the plurality of gateway road segments and the respective at least one road segment situated in the second geographical area. The method further comprises determining route information for the buffered initial routes and/or the buffered successive routes, the route information parameterizing associated costs for travelling along the respective routes and indicating the respective gateway road segment associated with the respective route. The method further comprises, for the at least some of the road segments situated in the second geographical area, storing in the database the determined route information for the buffered successive routes as road segment data.

For example, only the buffered successive routes may be stored; or both the buffered successive and initial routes may be stored in the database. Therefore, the database may be referred to as a database of road segment data. In particular, such a database of road segment data may be employed to estimate the cruising range via estimating the ability of the vehicle to reach a plurality of target road segments according to the respective aspects and embodiments discussed above.

For example, the gateway road segments may be those road segments being located on the boundary between the first and second geographical areas. It may also be possible that the gateway road segments are in a predefined relationship to the boundary, i.e., shifted towards or away from the current location by a predefined distance etc. For example, it may be possible to determine the gateway road segments such that only those road segments of all the road segments comprised in the digital map data are selected as gateway road segments which have a hierarchy class larger or smaller than a predefined threshold. For example, the hierarchy class may classify roads with respect to average speed, traffic capacity, or through traffic. Larger hierarchy classes may correspond to, e.g., highways and arterial roads, while smaller hierarchy classes may correspond to, e.g., local roads and feeder roads. For example, it may be possible to limit the number of gateway road segments; e.g., this may be done by adaptively setting the predefined hierarchy class threshold.

Continuing the road network search may refer to expanding route links starting from the at least one road segment situated in the first geographical area, picking up the respective gateway road segments and continuing the expanding of the road links until the at least one road segment situated in the second geographical area is reached.

Continuing the road network search may also comprise starting new or further road network searches for the at least one road segment.

In various embodiments, the at least one road segment situated in the first geographical area may relate to all road segments situated in the first geographical area or all road segments situated in the first geographical area having a road hierarchy class above a threshold or a single road segment, preferably the current road segment.

Similarly, the at least one road segment situated in the second geographical area may correspond to all road segments situated in the second geographical area or only a fraction thereof, e.g., all road segments situated in a third geographical area.

In various embodiments, the method may further comprise, for the road segments situated in the first geographical area, storing in the database the determined route information for the buffered initial routes as road segment data.

In other embodiments, the method may not store route information for road segments located within the first geographical area. If the route information for the road segments situated in the first geographical area is stored in the database, it may be retrieved/selected from the database in the method of estimating the ability of the vehicle to reach the target road segment according to a further aspect; in particular, in such a case it may not be necessary to perform any road network search as part of the method of estimating the ability of the vehicle to reach a target road segment as the route information is already available and stored in the database. However, this may increase the storage or memory requirements of the database. If, on the other hand, the route information for the initial routes is not stored in the database, i.e., no route information is stored for the road segments which are situated in the first geographical area, this route information may be obtained by a comparably fast route search when executing the method of estimating the ability of the vehicle to reach a target road segment, i.e., on-the-fly.

When storing route information for a plurality of road segments situated in the first geographical area, various techniques are conceivable to determine this route information. For example, in a simple embodiment, for all the road segments in the first geographical area, a road network search may be performed to obtain the initial routes. In a further embodiment the method of generating the database may further comprise, for each of the plurality of gateway road segments, performing a reverse road network search to obtain first routes for a plurality of road segments situated in the first geographical area to each of the plurality of gateway road segments and buffering the obtained first routes as initial routes; and, for the plurality of road segments situated in the first geographical area, storing in the database the determined route information for the buffered successive routes as road segment data.

By performing the reverse road network search, links may be expanded from end to beginning of a road segment. Thereby, fewer computational efforts may be needed to provide the first routes between the plurality or all of the road segments situated in the first geographical area.

For example, the first routes, i.e., the initial routes, may be situated in the first geographical area, while the second routes, i.e., the successive routes, may be situated in the second geographical area. Then for any road segment within the first geographical area, initial routes to each of the plurality of gateway road segments may be buffered; while only a single second route may be buffered as successive route between a given gateway road segment and the respective road segment being situated in the second geographical area.

The given gateway road segment for which the successive route is buffered may be the optimum one, i.e., provide the optimized route to reach the respective road segment: the successive route may be the second route associated with minimum costs if compared to all second routes between each of the plurality of gateway road segments and the respective road segment situated in the second geographical area. For example, the successive route may be the shortest or quickest or most energy-efficient route to reach the respective road segment from any one of the gateway road segments. The selection with respect to which type of cost the road network search provides the routes may depend on a user setting or a predefined system setting. In this light, the gateway road segments may be considered as those road segments which are likely to be passed when leaving the first geographical area to travel to the road segments in the second geographical area.

It should be understood that it is not necessary to store as the road segment data detailed information on the initial and successive routes, e.g., the exact identification of all road segments contained in the respective route. Rather, it may be sufficient to store the route information parameterizing the associated costs, e.g., cumulative costs for travelling along the respective route, and indicating the gateway road segment being the end point for the initial routes and being the starting point for the successive routes. This may allow the size of the database to be decreased.

The method of generating the database may further comprise determining an approximated cruising range of the vehicle, wherein the determining of the first and second geographical areas is based on the approximated cruising range. For example, the cruising range may be determined independently of the network of the road segments of the digital map data by comparing an amount of available resources, e.g., available energy or fuel, with respective consumption parameters, e.g., an average consumption or an amount of available travel time. In such a case, the approximated cruising range may be independent of the geographical direction, i.e., form a radius around the current location of the vehicle. However, it may also be possible to determine the approximated cruising range based on costs required for travelling along the road segments of the digital map data, i.e., by performing a road network search. In any scenario, the boundary between the first and second geographical areas may be determined based on the approximated cruising range.

For example, the boundary between the first and second geographical areas may be determined such that a distance between the current location of the vehicle and the boundary amounts to a predefined fraction of a distance between the current location and the approximated cruising range. Moreover, the outer boundaries of the second geographical area may be determined based on the approximated cruising range. For example, the outer boundaries of the second geographical area may be in a predefined relationship with the approximated cruising range, e.g., extend beyond the approximated cruising range by a predefined distance. This predefined distance may also correspond to zero.

Such a scenario may allow to adapt the accuracy of the estimating of the cruising range which is based on the generated database to the current amount of available resources. For example, if the approximated cruising range is comparably large, it may be possible to provide a comparably large first geographical area. On the other hand, if the approximated cruising range is comparably small, it may not be necessary to increase the size of the first geographical area and thereby provide more road segment data.

The method of generating the database may further comprise determining a third geographical area, wherein the third geographical area is a fragment of the second geographical area and has inner boundaries being defined by a lower threshold of costs associated with reaching the inner boundaries and has outer boundaries being defined by upper thresholds of costs associated with reaching the outer boundaries. The determined route information may be buffered and/or stored for those road segments being situated at the same time in a second and third geographical area. For example, the third geographical area may correspond to that geographical area where it is estimated that the amount of available resources runs low, i.e., falls below a given threshold. It may particularly be relevant to estimate the cruising range for those road segments based on the database. Therefore, storing of the route information may be restricted to those road segments being located in a third geographical area. This may allow the size of the database to be reduced further.

In a further embodiment, the method may further comprise estimating a cruising range of the vehicle based on cost required for travelling along the road segments, wherein the determined route information may be buffered and/or stored for those road segments situated in the second geographical area and in a proximity of the estimated cruising range.

According to a further aspect, a navigation system of a vehicle is provided. The navigation system comprises a positioning unit configured to determine a current location of the vehicle. The navigation system further comprises a map database comprising digital map data of road segments and a database being configured for storing road segment data for the road segments, the road segment data containing previously generated route information for routes connecting the road segments, the route information parameterizing costs associated for travelling along the respective route. The navigation system further comprises a processor being configured to perform the following steps: retrieving digital map data comprising road segments in a vicinity of a current location of the vehicle, the digital map data comprising the target road segment; and retrieving road segment data for at least some of the road segments from a database; and establishing a current road segment based on the current location of the vehicle; establishing, from the retrieved road segment data, first road segment data for the target road segment, the first road segment data indicating a gateway road segment and indicating the route information for a successive route from the gateway road segment to the target road segment; determining, based on the route information for the successive route, first costs for travelling on the successive route; establishing, based on the indicated gateway road segment, second road segment data for the current road segment, the second road segment data indicating route information for an initial route from the current road segment to the gateway road segment; determining, based on the route information for the initial route, second costs for travelling on the initial route; and estimating, based on the determined first and second costs, the ability of the vehicle to reach the target road segment.

The navigation system may be configured to perform a method of estimating an ability of the vehicle to reach a target road segment according to a further aspect, a method of estimating a cruising range according to an embodiment, and a method of generating a database according to a further aspect.

For such a navigation system, effects may be obtained which are comparable to the effects obtained for the methods according to various aspects and embodiments of the invention.

It is to be understood that the features mentioned above and features yet to be explained below can be used not only in the respective combinations indicated, but also in other combinations or in isolation, without departing from the scope of the invention. Features of the above-mentioned aspects and embodiments may be combined with each other in other embodiments.

These and other objects, features and advantages of the present invention will become apparent in light of the detailed description of the embodiments thereof, as illustrated in the accompanying drawings. In the figures, like reference numerals designate corresponding parts.

DESCRIPTION OF THE DRAWINGS

The foregoing and additional features and effects of the various embodiments of the invention will become apparent from the following detailed description when read in conjunction with the accompanying drawings, in which like reference numerals refer to like elements.

DETAILED DESCRIPTION OF THE INVENTION

With reference to the drawings, techniques for estimating a cruising range of a vehicle will be discussed. While those techniques are discussed primarily with respect to the cruising range being associated with an amount of available energy/fuel of the vehicle, it is to be understood that, likewise, the techniques apply to the cruising range being associated with an amount of available travel time or an amount of available travel distance or a combination thereof. Such cruising ranges may indicate all locations which are reachable within a given time or are reachable by travelling a certain given distance.

Figure 1:
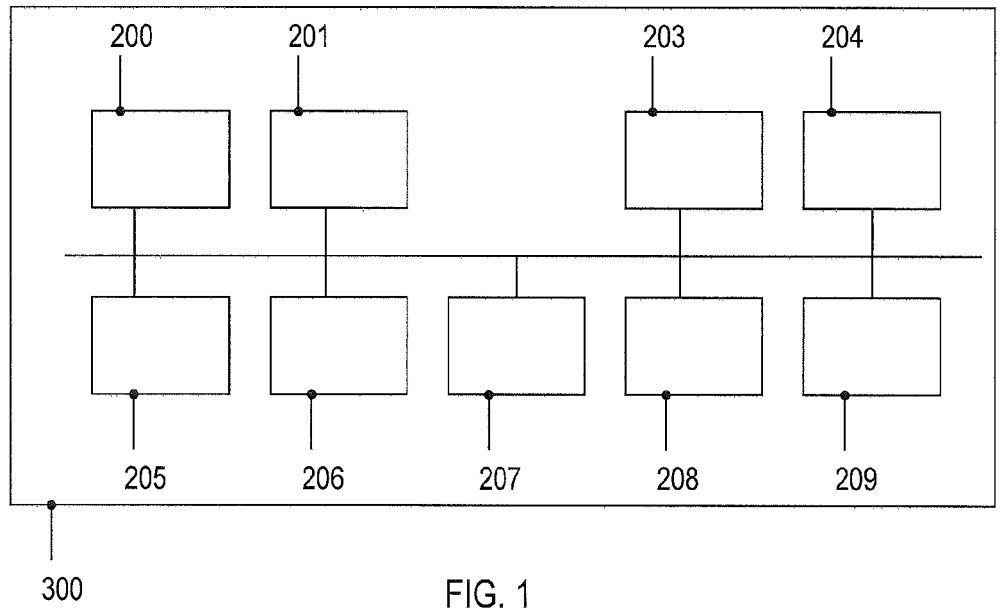
FIG. 1 schematically illustrates a navigation system.

FIG. 1 schematically illustrates a navigation system 300. The navigation system 300 comprises a positioning unit 204 which is configured to determine a current location of the vehicle. For example, the positioning unit 204 may be a global positioning system (GPS) or the like. Furthermore, the navigation system 300 comprises a map database 200 provided on storage means. The map database 200 contains for example digital map data. The digital map data provides road segments. A processor 203 is configured to determine a current road segment from the road segments of the digital map data based on an input of the positioning unit 204. Conventional vehicle navigation can be performed by the navigation system 300 using the processor 203, the positioning unit 204, and the digital map data of the map database 200.

Furthermore, the navigation system 300 comprises an energy/fuel level sensor 207 and further sensors 208. The sensors 207, 208 can be configured to provide information on a current amount of available energy/fuel and a rate of consumption of the energy/fuel. In case the vehicle is an electrically driven vehicle, the resources relate to electrical energy stored on a battery. In case the vehicle is a conventionally fuel-driven vehicle, i.e., using a combustion engine, the resources relate to an amount of gasoline or Diesel. The further sensors 208 can provide information on the consumption. For example, the further sensors 208 can provide a moving average of the current consumption of energy/fuel. Furthermore, the further sensors 208 can provide information on the number of passengers, the load of the vehicle, driving habits of the driver of the vehicle, etc. All such information can be combined in order to provide an estimate of the consumption of energy/fuel. Using such information, the processor 203 is configured to estimate a cruising range of the vehicle. The cruising range may indicate all locations which are reachable given this amount of available energy/fuel in comparison to the costs to reach a certain location.

In order to estimate the cruising range in a computationally inexpensive and efficient manner, a database 201 may be provided. The database 201 is configured for storing road segment data for the road segments contained in the digital map data, wherein the road segment data contains route information for routes connecting the road segments which is generated from time to time by the processor 203. This route information may parameterize the costs for travelling along the respective routes. The route information may be used by the processor 203 in order to determine the ability of the vehicle to reach a plurality of road segments and from this estimate the cruising range. The structure of the database 201 is such that the ability of the vehicle to reach the plurality of road segments can be derived from a two-step process: route information is provided for initial routes in the vicinity of the current location of the vehicle to gateway road segments; from the gateway road segments onwards, route information for successive routes is provided. Hereinafter, methods and techniques will be explained in further detail to this respect.

The navigation system 300 further comprises a display 205, which can be used in order to graphically indicate the cruising range. For example, the cruising range can be depicted using a range polygon, i.e., a piecewise linear connection, or a spline, i.e., piecewise cubic connection, etc. in a map view. The map view can contain several other information, such as a calculated route, points of interest, the network of road segments, urban areas, labels, gas stations, etc.

The navigation system 300 further comprises a user interface 209 which allows user input and user output to and from a user, e.g., the driver of the vehicle. For example, via the user interface 209, the user may specify a desired target location, may zoom in or zoom out of the map view, or may interact in any other way with the parameters and functions of the navigation system 300. The user interface 209 may include buttons, voice control, gesture recognition, etc.

Furthermore, the navigation system 300 comprises a communication interface 206. For example, the communication interface 206 establishes a wireless connection from the vehicle to a remote server. Configuration data and operating instructions can be sent via a thus established communication link to the navigation system 300. It is also possible that parts of the methods and techniques described hereinafter are executed on the remote server. For example, the results of the cruising range estimation can be downloaded to the navigation system 300. In particular, it may be possible to perform the computationally expensive calculations at the remote server and then provide the content of the database 201 to the navigation system 300 via the communication interface 206.

The processor 203 can retrieve the digital map data from the storage device 200 and may be configured to perform a road network search for generating the database 201 based on the digital map data. The road network search corresponds to expanding route links along the road segments based on associated costs in order to provide cost-optimized routes between two road segments. Various methods of performing the road network search are known, e.g., the method according to Dijkstra or derived methods. Such methods of performing the road network search rely upon costs associated with each expanded route link Different types of costs can be defined in view of travel time along the road segment, in view of the travel distance along the road segment, or in particular in view of energy consumption needed when travelling along the road segment. The road network search yields a route being optimized with respect to such costs or a combination of such costs. For example, the route of minimized or minimum travel time, i.e., the fastest route; or the route of minimized or minimum travel distance, i.e., the shortest route; or the route with minimized or minimum energy consumption between the current road segment and a target road segment may be obtained.

Figure 2:
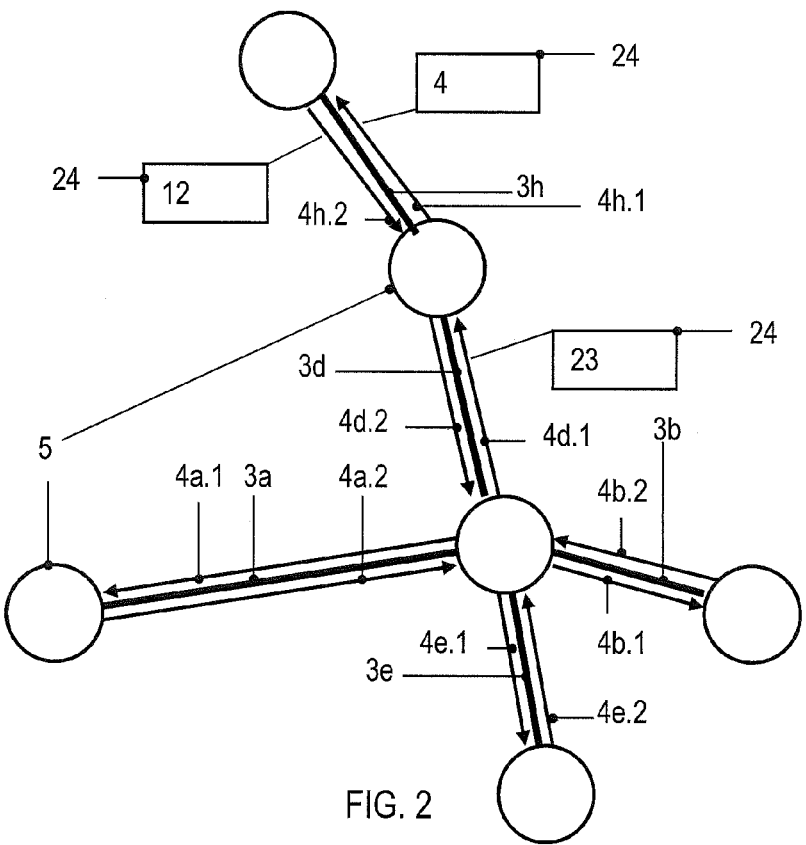
FIG. 2 is a schematic illustration of road segments and nodes of digital map data and route links expanded by a road network search.

Details of the techniques of performing the road network search by the navigation unit 300 are schematically illustrated in FIG. 2. In FIG. 2, a number of road segments 3a, 3b, 3d, 3e, 3h are illustrated. The road segments expand between nodes 5 of defined geographical location. Various data formats of the digital map data containing the road segments 3a, 3b, 3d, 3e, 3h are known to the skilled person, relying on the nodes 5 and/or the connections between the nodes 5. The road network search expands unidirectional or bidirectional links along the road segments 3a, 3b, 3d, 3e, 3h, i.e., between the respective nodes 5. Such route links 4a.1, 4a.2, 4b.1, 4b.2, 4d.1, 4d.2, 4e.1, 4e.2, 4h.1, 4h.2 are illustrated in FIG. 2 using arrows. For some of these route links, in FIG. 2 there are schematically illustrated associated energy consumption costs 24 as integer numbers. The consumption costs 24 relate to the amount of fuel or energy necessary to travel along the specific road segment by means of the respective route link. As can be seen, for example in the case of the road segment 3h, a road segment may comprise more than one respective route link, in the case of the road segment 3h, there are provided two opposing route links 4h.1, 4h.2, e.g., northbound and southbound travel. The two route links 4h.1, 4h.2 relate to opposing connections between the delimiting nodes 5.

When determining the ability of the vehicle to reach a target road segment according to one embodiment, the fuel or energy consumption necessary to reach the target road segment may be determined based on the respective costs for a route obtained from the road network search. The ability of the vehicle to reach the target road segment may be determined based on a comparison of the costs and the available energy. If the available energy is not sufficient to reach the target road segment by the particular route, then the target road segment may be estimated as not being reachable; and vice versa. The cruising range can be estimated based on the ability of the vehicle to reach a plurality of road segments. For example, a range polygon may be provided which encircles or circumferes the cruising range, i.e., determines an outer boundary of all target road segments which are estimated as being reachable.

With respect to the following FIGS. 3-10, techniques and methods according to various embodiments will be explained in detail which allow the computational efforts needed to accurately estimate the cruising range of the vehicle to be reduced.

These techniques and methods rely on defining a first geographical area and a second geographical area, the first geographical area being a connected geographical area and surrounding the current location of the vehicle. Gateway road segments are provided on the boundary between the first and second geographical areas. These gateway road segments function as the gateway for travelling from the current location to locations outside the first geographical area, i.e., there is a high probability that the gateway road segments are indeed contained in the travel to the more remote road segments in the second geographical area. Road segment data is provided for the road segments, the road segment data providing route information for routes obtained from the road network search: within the first geographical area, route information is provided for all road segments for initial routes to all gateway road segments; in the second geographical area, route information is provided for a single successive route from an optimum gateway road segment. In other words, the amount of data provided for the road segments located in the first geographical area is larger than the amount of data for road segments located in the second geographical area. The route information may contain parameterized costs for the respective initial and successive routes and indicates the associated gateway road segment being the starting point or end point. Using this pre-generated route information, it is possible to determine the ability of the vehicle to reach a target road segment in the second geographical area in a computationally inexpensive and efficient manner based on the parameterized costs.

Figure 3:
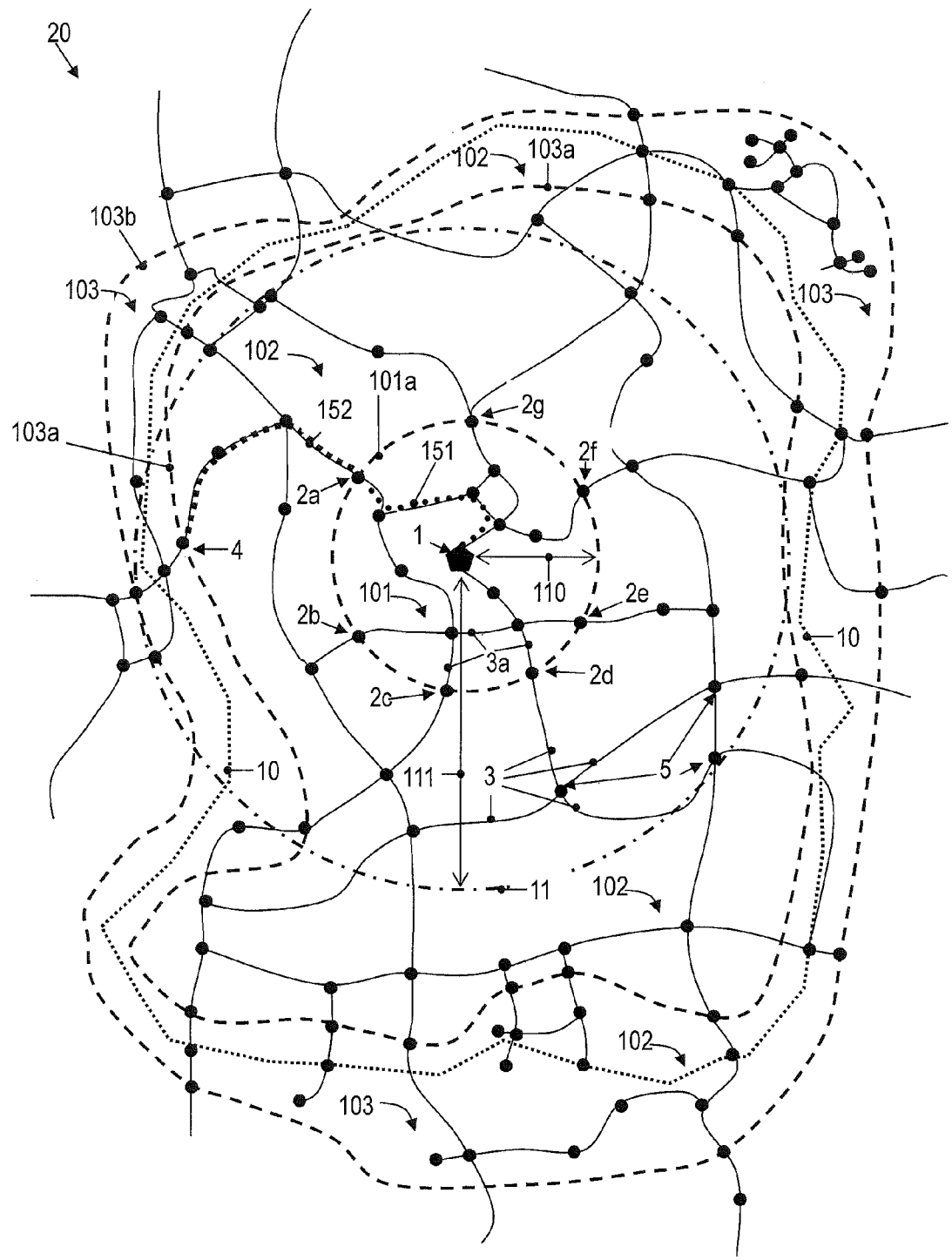
FIG. 3 schematically illustrates the digital map data comprising a current road segment, a target road segment, and gateway road segments.

Details of these techniques are discussed with respect to FIG. 3. FIG. 3 schematically illustrates the network of the road segments 3, 3a. In particular, a current location or current road segment 1 is indicated in the center of FIG. 3. Furthermore, a target road segment 4 is visible, for which the ability of the vehicle to reach it, given a current amount of available energy/fuel, is to be estimated. Furthermore visible in FIG. 3 is the outer boundary 101a of the first geographical area 101. The first geographical area 101 is a connected area and contains the current location 1. Those of the road segments 3, 3a which are situated within the first geographical area 101 are labeled as the road segments 3a. In the embodiment of FIG. 3, the first geographical area 101 has a circular shape, i.e., is defined by a fixed radius of predefined distance 110. However, in general, the first geographical area 101 does not have to have a circular shape and can be determined, e.g., dependent on the network of road segments 3 or in dependence of a geographical direction or a heading of the vehicle or a terrain elevation. Furthermore visible in FIG. 3 is an approximated cruising range 11 (dashed-dotted line). The approximated cruising range 11 is calculated given the current amount of available energy/fuel and a moving average of the energy/fuel consumption and therefore may be considered as a first rough approximation of the cruising range. As it is determined independent of the network of the road segments 3, 3a, it is of circular shape with a radius having a certain distance 111 to the current location 1. In the embodiment of FIG. 3, the predefined distance 110 defining the radius of the first geographical area 101 is determined as a given fraction of the distance 111, e.g., 40%. In practical implementations, the distance 110 may range between approximately 2 km and 30 km, preferably between 10 km and 20 km.

Furthermore depicted in FIG. 3 is the estimated cruising range 10 in the form of a range polygon. In order to estimate the cruising range 10, the processor 203 is configured to estimate the ability of the vehicle to reach a plurality of the road segments 3 in the second geographical area 102, one of which is the target road segment 4 depicted in FIG. 3. For this target road segment 4, in the following the techniques to estimate the ability of the vehicle to reach it will be discussed in greater detail. Based on the information which road segments 3 are reachable and which are not reachable, the cruising range 10 is estimated. In particular, the processor 203 is configured to estimate the ability of the vehicle to reach all those road segments 3 which are located in a third geographical area 103; and possibly not the ability of the vehicle to reach those road segments 3 which are situated outside the third geographical area 103. The third geographical area 103 has the boundaries 103a and 103b. It may also be determined during the road network search, e.g., when 95% if the approximated cruising range has been reached by expanding route links. This can save computational efforts and reduce the size of the database 201.

Figure 4:
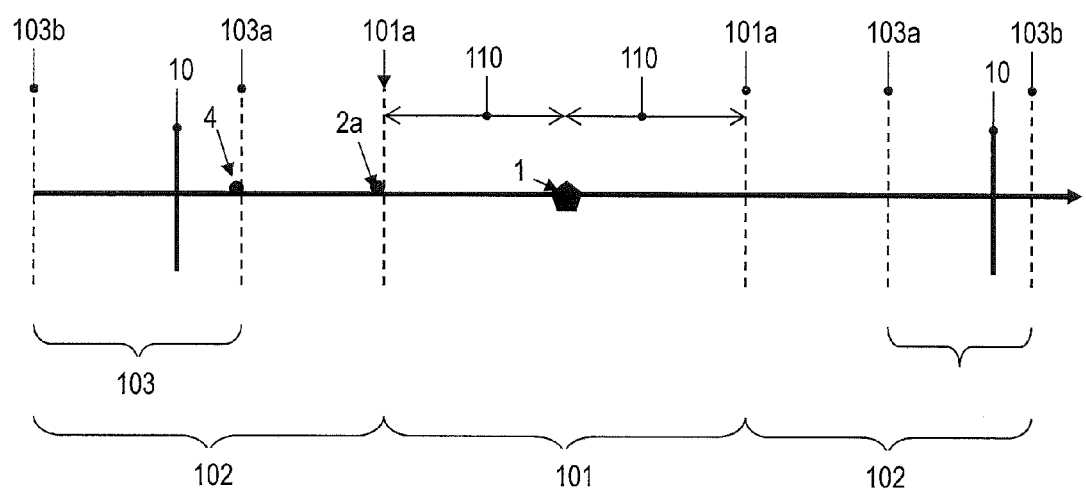
FIG. 4 is a cross-sectional view of FIG. 3, further illustrating first, second, and third geographical areas.

Turning to FIG. 4, the relationship between the first, second and third geographical areas 101, 102, 103 is illustrated in further detail. FIG. 4 is a cross-sectional view through FIG. 3. As can be seen, the first geographical area 101 comprises the current location 1. Adjacent towards larger distances to the current location 1, is the second geographical area 102. The third geographical area 103 is a fragment of the second geographical area 102 and has the inner boundaries 103a and outer boundaries 103b. For example, the outer boundaries 103b may also delimit the second geographical area 102. In the example of FIGS. 3 and 4 the target road segment 4 is situated on the inner boundary 103a; but may in general be situated anywhere in the third geographical area 103.

Turning back to FIG. 3, when the processor 203 (FIG. 1) determines the ability of the vehicle to reach the target road segment 4, it retrieves road segment data for the target road segment 4 from the database 201 (FIG. 1). This road segment data indicates the gateway segment 2a for which a previous road network search has yielded that the successive route 152 is the optimized route between any of the gateway road segments 2a-2g and the target road segment 4. For example, the successive route 152 between the gateway road segment 2a is shorter and/or faster and/or more energy-efficient than any routes between the remaining gateway road segments 2b-2g and the target road segment 4. The successive route 152 is indicated in FIG. 3 using a short dashed line. The route information retrieved for the target road segment 4 further parameterizes energy consumption costs associated for travelling along the successive route 152. From these parameterized costs it is directly possible to derive the actual energy consumption costs necessary for the vehicle to travel along the successive route 152.

Once the respective gateway road segment 2a is identified by the route information of the road segment data retrieved for the target road segment 4, further route information for the initial route 151 can be obtained from road segment data for the current road segment 1. In particular, the road segment data for the current road segment 1 comprises route information for routes connecting the first road segment 1 with each of the gateway road segments 2a-2g. From this, the particular route information for the initial route 151 connecting to the respective gateway road segment 2a is selected. Again, this route information for the initial route 151 parameterizes costs associated for travelling along the initial route 151 from which the actual costs can be directly derived. The processor 203 is configured to determine these first and second costs from the route information from the initial and successive routes 152, 151, respectively. Based on the determined first and second costs, the processor is configured to estimate the ability of the vehicle to reach the target road segment 4. For example, this can occur by comparing an available amount of energy/fuel with the sum of the first and second costs.

It should be understood that by such a technique it is not necessary to perform the entire road network search each time the ability of the vehicle to reach a given target road segment 4 from the current location 1 needs to be estimated. Rather, the road segment data provisioned in the database 201 can be previously generated and used as long as the current location 1 lies within the first geographical area 101. This is illustrated by the following example: if the current location changes slightly with respect to the case depicted in FIG. 3, e.g., the vehicle travels north by a small distance and is still well within the first geographical area 101, the successive route 152 may remain the same while the initial route 151 may change. As initial routes are provided between all of the road segments 3a situated within the first geographical area 101 and all of the gateway road segments 2a-2g, new route information/parameterized costs can be obtained. In other words, by dividing the route between the current location 1 and the target road segment 4 into successive route 152 and the initial route 151, a computationally inexpensive, yet accurate estimating of the cruising range is achieved. However, such techniques rely on, firstly, generating the database of the road segment data, and secondly, on estimating the cruising range based on the road segment data. This two-step approach is illustrated with respect to the FIGS. 5-8.

Figure 5:
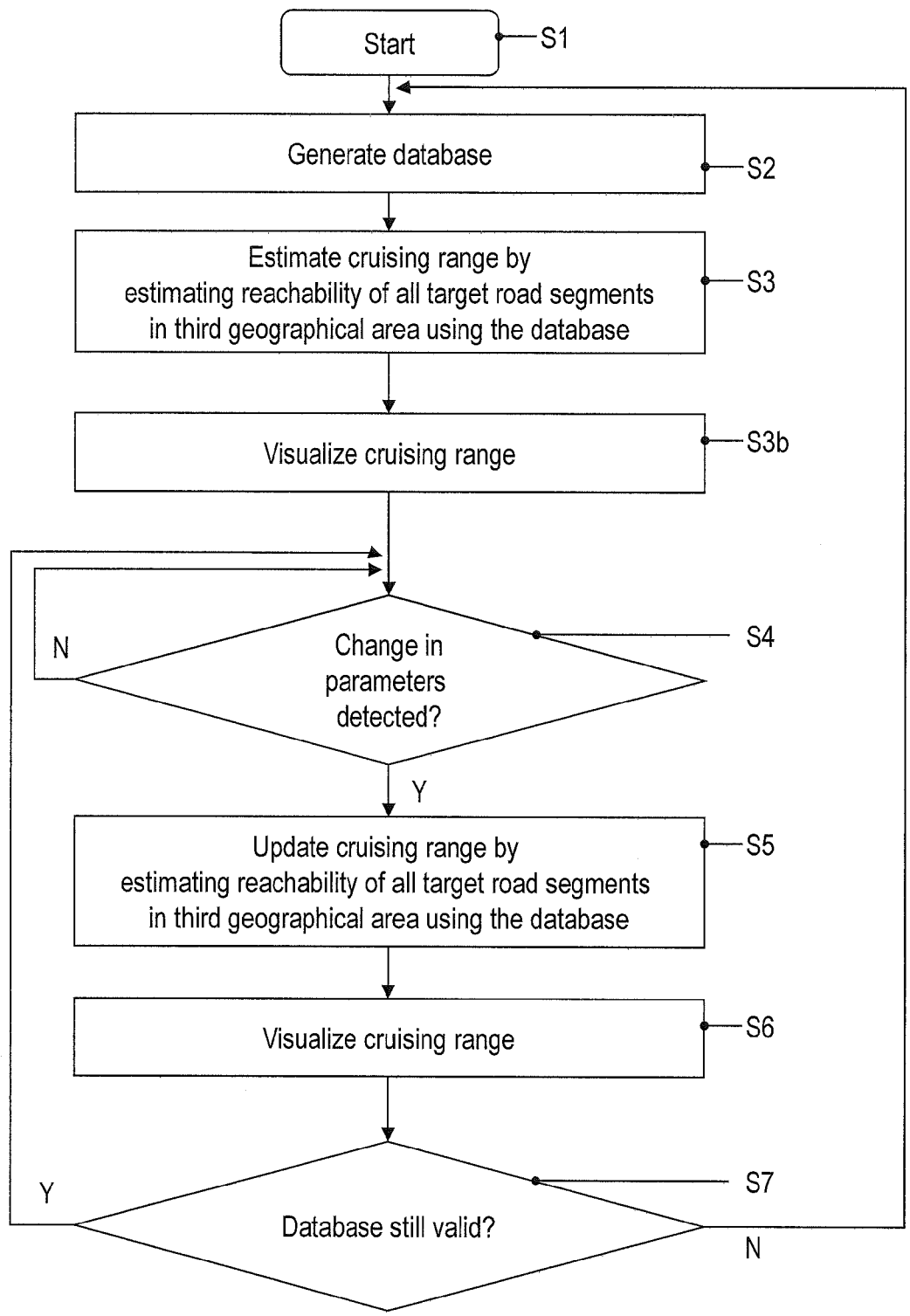
FIG. 5 is a flowchart of a method of generating a database, estimating a cruising range, updating of the database, and estimating an ability of a vehicle to reach a target road segment according to various embodiments of the invention.

Accordingly, turning to FIG. 5 the overall method of generating the database 201 and estimating the cruising range 10 is discussed using the flowchart.

Figure 6A:
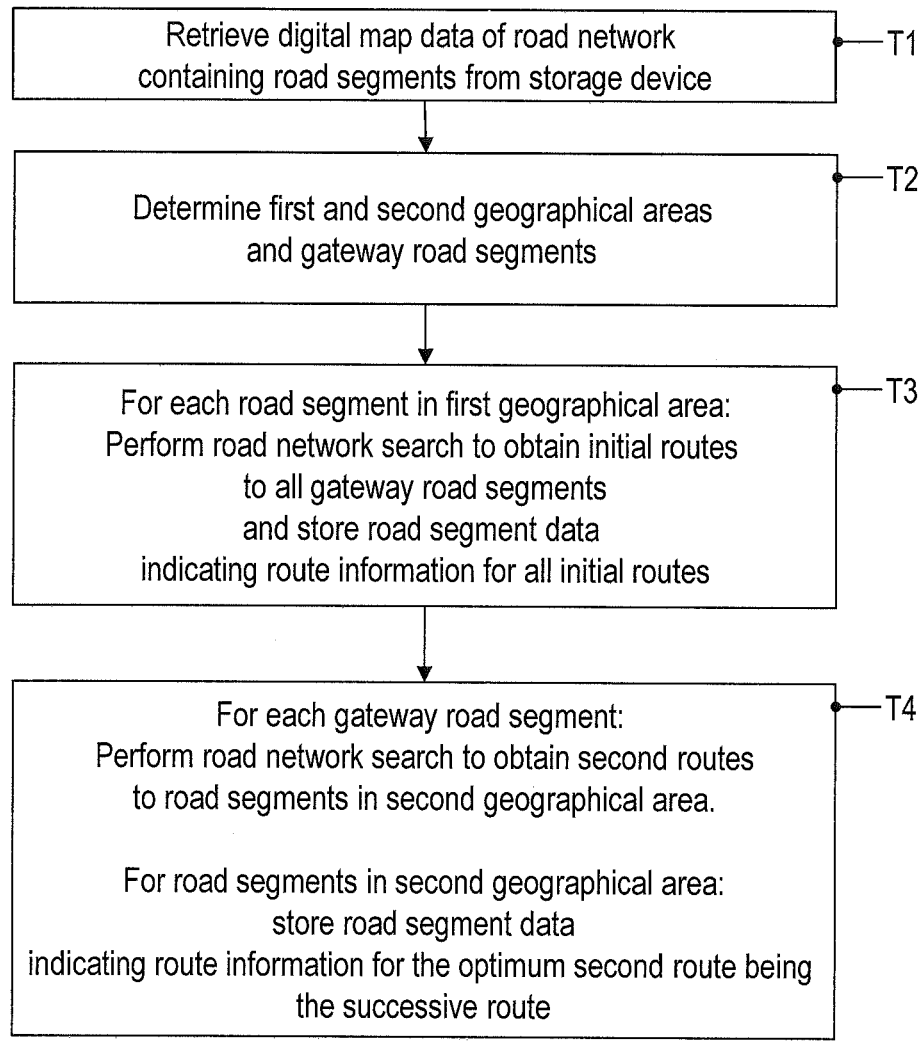
FIG. 6A is a more detailed flowchart of the method of generating a database of FIG. 5 according to various embodiments of the invention.

The method starts in step S1. In step S2, the method of generating the database 201 of road segment data for estimating the cruising range 10 is executed by the processor 203, e.g., at the time of vehicle start-up or upon user input. The steps T1-T4 of FIG. 6A show a more detailed view of the step S2 of FIG. 5.

First, in step T1, the digital map data 20 of the network of road segments 3, 3a is retrieved from the map database 200. Next, in step T2, the first and second geographical areas 101, 102 are determined. For example, the first and second geographical areas 101, 102 can be determined based on the approximated cruising range 11. For example, the first geographical area 101 can be a predefined fraction of the approximated cruising range 101, while the second geographical area extends for a predefined distance beyond the outer boundaries of the approximated cruising range 11. Furthermore, in step T2, the gateway road segments 2a-2g are determined. The gateway road segments 2a-2g are, in a simple embodiment, located on the boundary between the first and second geographical areas 101, 102.

Next, in step T3, for all road segments 3a in the first geographical area 101, the road network search is performed to obtain the initial routes 151 which connect each of the road segments 3a with each of the gateway road segments 2a-2g. The initial routes 151 can be optimized with respect to various parameters such as travel time and/or travel distance and/or energy/fuel consumption. This may depend on a user preference, driving habits, etc. It should be understood that some results of the road network search for a given road segment 3a can be utilized in a subsequent road network search for a further road segment 3a. For example, in case the two road segments 3a are situated in close vicinity, it may be possible to use results of the prior road network search for the next road network search, e.g., provide an incremental update or the like. This may allow the computational efforts needed for step T3 to be reduced.

Figure 9:
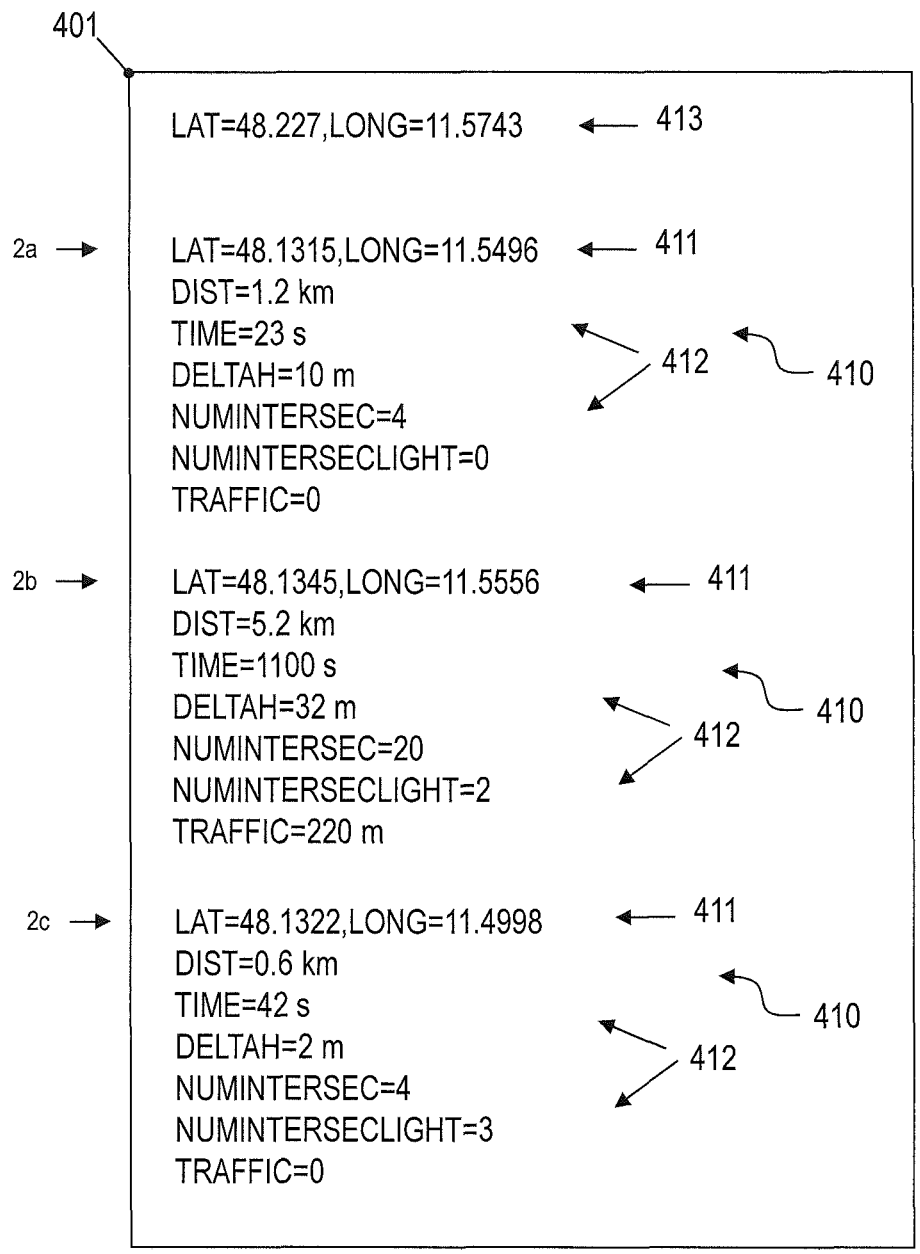
FIG. 9 illustrates road segment data containing route information for initial routes between a road segment being situated in the first geographical area and all gateway road segments.

Once the road network search has been performed for all the road segments 3a within the first geographical area 101, the road segment data can be generated and stored in the database 201 for the initial routes 151. Such road segment data 401 is schematically illustrated in FIG. 9. The road segment data 401 contains a reference 413 identifying the particular road segment 3, 3a, in particular with respect to the digital map data 20. In the embodiment of FIG. 9, the road segment reference 413 is in the form of longitude and latitude of the particular road segment 3, 3a. However, other references are conceivable, such as unique identifiers, etc. Furthermore, the route information 410 for the different initial routes 151, i.e., the initial routes 151 to each of the gateway road segments 2a-2g is provided. For the sake of simplicity, in FIG. 9 the route information 410 is depicted for the gateway road segment 2a, 2b, 2c only, however, this shall not to be construed as being limiting. The route information 410 contains a reference 411 to the respective one of the gateway road segments 2a-2g, again in the form of latitude and longitude. Furthermore, the route information 410 contains parameterized costs 412 for energy/fuel consumption for travelling along the respective one of the initial routes 151. These parameterized costs 412 specify a distance of the route, a time to travel along the route, a height or elevation difference of the route, speed and/or slope and/or acceleration profiles, a number of intersections and a number of intersection with traffic lights, as well as the length of traffic obstruction. These are illustrating examples only and must not be construed as being limiting. From such parameterized costs it is possible to derive the actual costs for travelling along the respective one of the initial routes 151, e.g., a value in liters or kWh. For example, the actual costs may be larger for a longer distance, a higher height difference, a larger number of intersections, and a longer traffic obstruction distance. For example, the actual costs may be derived by considering the parameterized costs 412 together with a moving average of the current energy/fuel consumption or other driver-specific or vehicle-specific factors. It is also possible that the cost 412 directly indicate the actual energy consumption needed for travelling along the route.

While in FIG. 9 the parameterized costs 412 are depicted with respect to energy/fuel consumption, it is also possible to provide the parameterized costs 412 with respect to, e.g., travel time. Furthermore, it should be understood that the parameterized costs 412 do not need to be of the same type of the costs for which the respective route has been optimized. For example, the initial routes 151 to the gateway road segments 2a-2g may correspond to the shortest routes, while the parameterized costs 412 correspond to the energy/fuel consumption.

Turning back to FIG. 6A, in step T3, after having determined the road segment data 401 for the road segments 3a within the first geographical area 101, the road segment data 401 is stored in the database 201.

Figure 10:
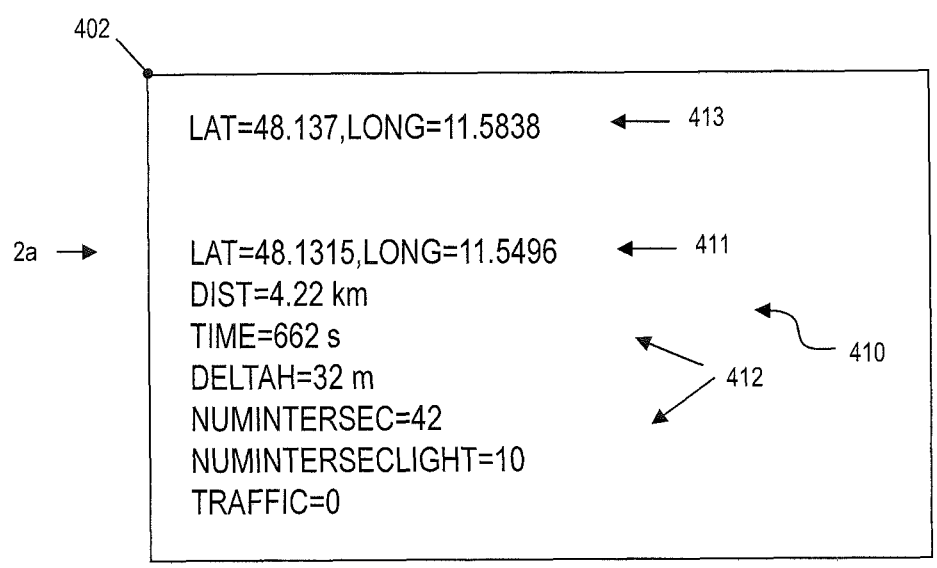
FIG. 10 illustrates road segment data containing route information for a successive route between a gateway road segment and a target road segment being situated in the third geographical area.

Next, in step T4, for each gateway road segment 2a-2g, the road network search is performed by the processor 203 in order to obtain second routes connecting each of the gateway road segments 2a-2g with those road segments 3 situated in the second geographical area 102, i.e., the potential target road segments 4. From this plurality of second routes, for each road segment 3 in the second geographical area 102 an optimum one is selected, e.g., the one second route with minimum cost consumption, e.g., minimum travel time or minimum energy/fuel consumption. For this successive route 152, the route information 410 is determined and stored as part of the respective road segment data 402. This is illustrated in FIG. 10.

While in step T4 of the embodiment of FIG. 6A the road segment data 402 has been determined and stored for all the road segments 3 located in the second geographical area 102, it should be understood that in general it is possible to perform step T4 only with respect to road segments 3 located in the third geographical area 103. To this respect, it may be possible to determine the cruising range by a comparably quick and simple method before executing step T4 and then determine the third geographical area 103 on basis of the approximated cruising range.

Figure 6B:
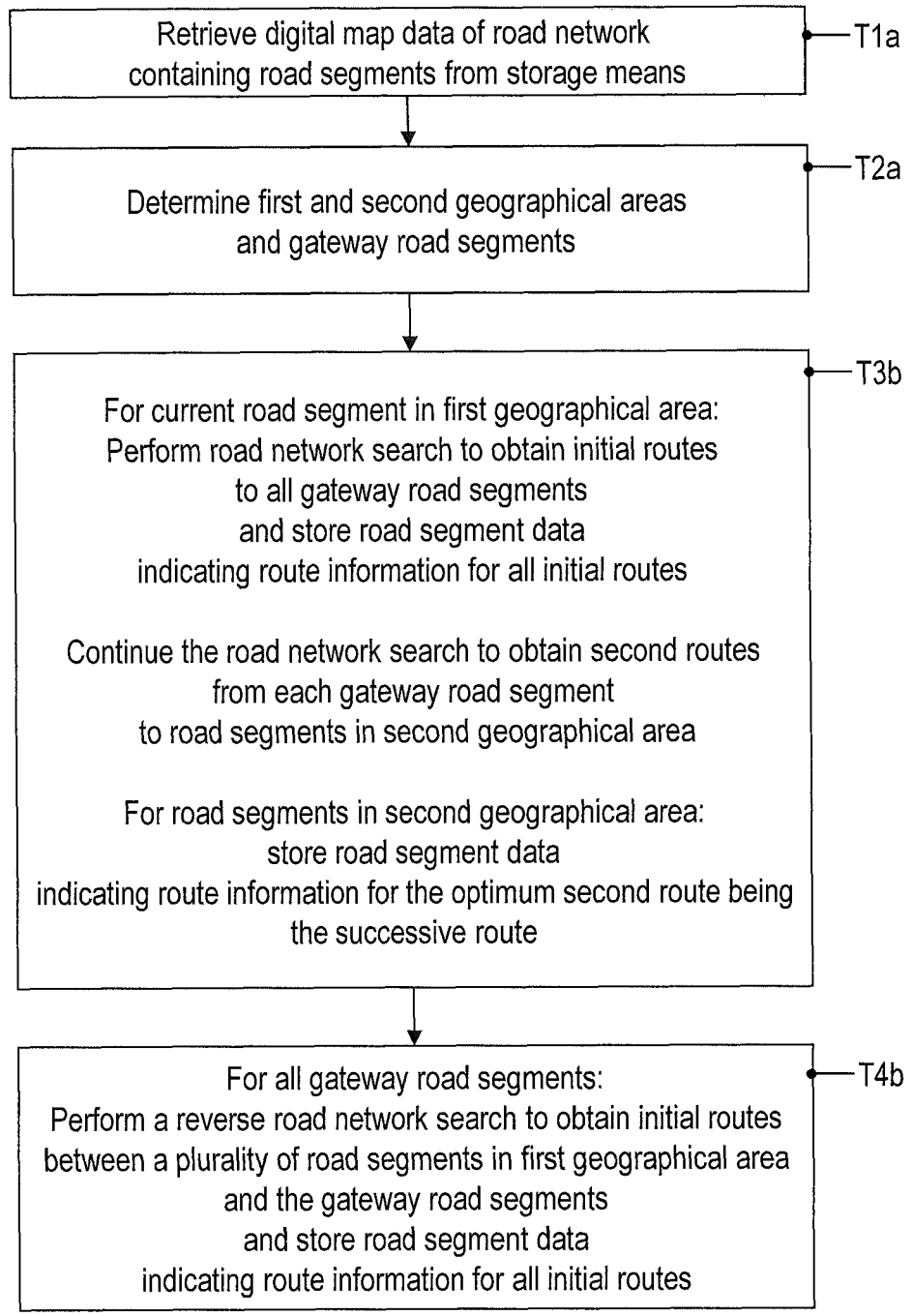
FIG. 6B is a more detailed flowchart of the method of generating a database of FIG. 5, according to further various embodiments of the invention.

In FIG. 6B an alternative embodiment is illustrated. Generally, various techniques for performing the road network searches may be applied. In general, depending on the accuracy and the amount of available computational resources, different techniques are feasible. In FIG. 6B, steps T1b and T2b correspond to steps T1 and T2 of FIG. 6A as discussed above. Step T3b is a combination of the steps T3 and T4 of FIG. 6A where a different approach is used for the road network search. A single road network search starting from the current road segment expands route links. This provides the initial routes 151 from the current road segment 3b to the gateway road segments 2a-2g. The gateway road segments 2a-2g are picked up by the expanded route links and the road network search is continued to provide the successive routes 152 from each of the gateway road segments 2a-2g to at least one road segment 3 situated in the second geographical area 102. In step T4b, reverse road network searches are performed to provide and store the initial routes 151 between a plurality of road segments 3a situated in the first geographical area 101, i.e., not solely the current road segment 1, and the gateway road segments 2a-2g.

In FIG. 6A and FIG. 6B, the first road segment data 401 for the initial routes 151 is stored. However, it should be understood that it also possible to not store the first road segment data 401 for the initial routes 151, i.e., the routes in the first geographical area 101. This information may be determined by a separate road network search each time when the ability of the vehicle to reach a given target road segment 4 is estimated.

Figure 7:
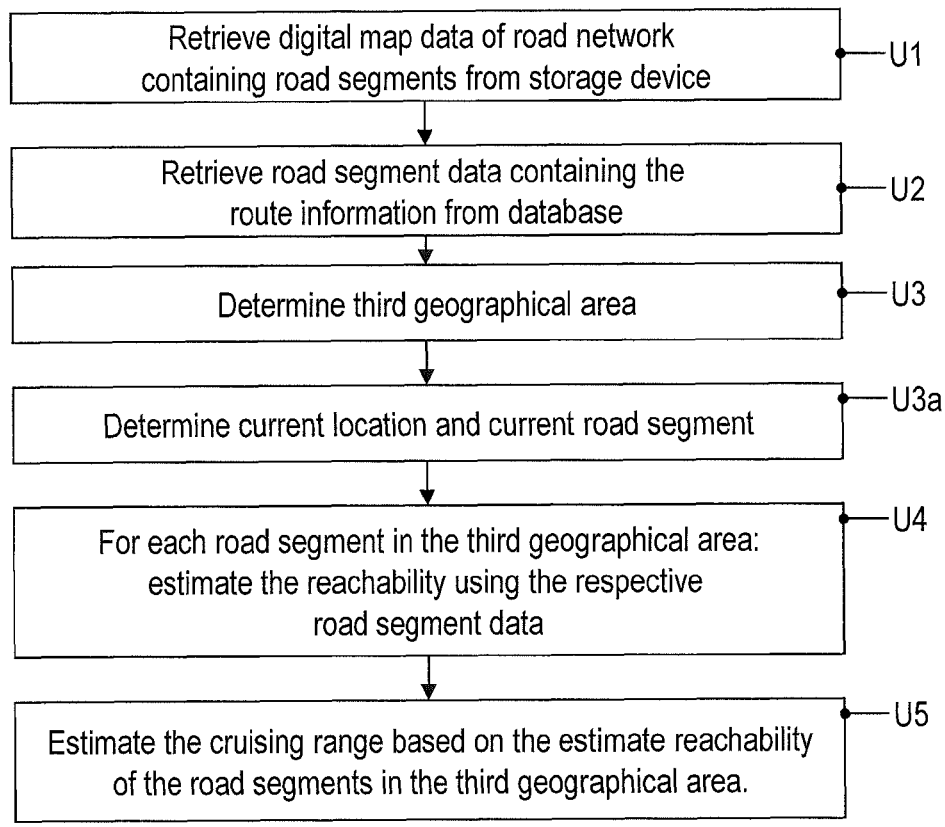
FIG. 7 is a more detailed flowchart of the method of estimating the cruising range of FIG. 5 according to various embodiments of the invention.
Figure 8:
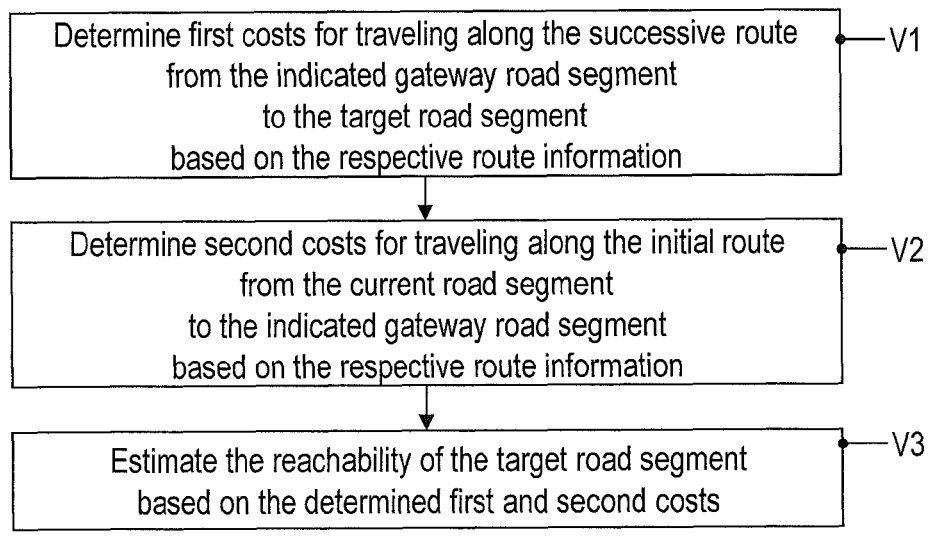
FIG. 8 is a more detailed flowchart of the method of estimating an ability of a vehicle to reach a target road segment of FIG. 5 according to various embodiments of the invention.

Once the steps T1-T4 of FIG. 6A or steps T1b-T4b of FIG. 6B have been successfully executed, the generating of the database 201 of step S2 in FIG. 5 is completed. Then it is possible to estimate the cruising range 10 in step S3 based on the generated database 201. This can be done by the methods of estimating the cruising range and estimating the ability of the vehicle to reach the target road segment 4 according to the various embodiments. Such methods are illustrated by the flowcharts of FIGS. 7 and 8. In FIG. 7, the digital map data 20 of the network of road segments 3, 3a is retrieved from the map database 200 in step U1. Next, in step U2, the road segment data 401, 402 containing the route information 410 is retrieved from the database 201, at least for the relevant road segments 3, 3a.

In step U3, being an optional step, the third geographical area 103 is determined. It should be understood that if the extents of the third geographical area 103 are already provisioned in the database 201, it is not necessary to perform step U3 in this context. For example, the road segment data 402 may be retrieved in step U2 only for the road segments 3 located within the third geographical area 103. In a simple embodiment, it is also possible to estimate the ability of the vehicle to reach all those road segments 3 which are located in the second geographical area 102; then it is not necessary to provision or determine the third geographical area 103.

In step U3a, the current location 1 and the current road segment are determined.

Next, in step U4, the ability of the vehicle to reach each road segment 3 in the third geographical area 103 is estimated. This is illustrated in further detail in FIG. 8. In FIG. 8, first, in step V1, first costs are determined for travelling along the successive route 152 from the gateway road segment 2a as indicated by the respective reference 411 in the road segment data 402 of the target road segment 4. The first costs are determined based on the route information 410 containing the parameterized costs 412. Next, in step V2, the second costs for travelling along the initial route 151 from the current road segment 1 to the indicated gateway road segment 2a, e.g., as determined from the respective reference 411 in step V1, are determined; this determining is based on the respective route information 410 of the road segment data 401 for the current road segment 1, or in various alternative embodiments, by first executing a road network search to provide the initial route 151 from the current road segment 1 to the indicated gateway road segment 2. Typically as the distance between the current road segment 1 and the indicated gateway road segment 2a is comparably small, this road network search may not occupy large computational efforts. On the other hand, this has the advantage that, e.g., the step T4b in FIG. 6B does not need to be executed and the road segment data 401 for the road segments 3a situated in the first geographical area 101 does not need to be stored in the database in steps T3 of FIG. 6 and T3b of FIG. 6B. This can save storage space.

In step V3, from a comparison of the sum of the first and second costs obtained in steps V1 and V2 with the amount of available energy/fuel, the ability of the vehicle to reach the target road segment 4 is estimated.

Having estimated the ability of the vehicle to reach the road segments 3 situated in the third geographical area 103, by executing the steps V1, V2, V3 of FIG. 8, in step U5 the cruising range 10 is estimated based on the estimated ability of the vehicle to reach the plurality of road segments 3. For example, the cruising range 10 can delimit those road segments which are estimated to be reachable from those estimated as not being reachable. However, it is possible that in step U5 further post-processing occurs. For example, a safety margin may be provided, i.e., some of the road segments that are estimated to be barely reachable, i.e., where the amount of available energy/fuel runs low, may be excluded from the cruising range 10, e.g., by a threshold comparison. Furthermore, it may be possible to determine gas stations from the digital map data, which are located close to the cruising range 10 and provide the user with a recommendation to fill up energy/fuel there. It may also be possible to consider off-road areas, i.e., areas of the digital map data where no road segment 3, 3a is present. For example, at a given location, the cruising range 10 may be limited by a dead end road: When reaching the end of this dead end road, a given amount of energy/fuel may be left. Then it may be possible to calculate the distance from the end point of the dead end road segment, which can be travelled off-road before the energy/fuel is entirely consumed. This can occur, e.g., in a manner which is independent of the geographical direction and/or may consider a height difference of the off-road terrain.

Once the cruising range has been estimated by the execution of the steps U1-U5 of FIG. 7, as well as by execution of the steps V1-V3 of FIG. 8, optionally in step S3b of FIG. 5, the cruising range 10 may be graphically illustrated or visualized. Graphically illustrating the cruising range 10 may occur, for example, as a range polygon in a map view output on the display 205.

In step S4 of FIG. 5, it is then checked whether a change in the parameters relevant for the cruising range 10 is detected. A change in the parameters may relate to a change in the amount of available energy/fuel, a change in any one of the parameters which influence the consumption, e.g., a new value of a moving average consumption value, new traffic messages, etc., or a significant change in the current location on the vehicle. For example, executing step S4 may comprise one or multiple threshold comparisons.

Step S5 is only executed if the change in the parameters as detected in step S4 is above a certain threshold. Then, in step S5, the cruising range 10 is updated by estimating the ability of the vehicle to reach all road segments 3 in the third geographical area 103 anew. It should be understood that the execution of step S5 can in principle be the same as the execution of step S3. Based on the updated cruising range 10 in step S5, it is possible to update the third geographical area 103, respectively; for example, the third geographical area 103 can be updated to contain the most recent cruising range 10 at all times.

In step S6 the cruising range 10 is visualized, for example by displaying as a range polygon in a map view output on the display 205.

In step S7 it is checked whether the database 201 is still valid. The checking of the validity of the database 201 in step S7 may comprise checking whether the road segment data 401, 402, i.e., the routes obtained from the road network search in the steps T3, T4 of FIG. 6, are still valid or whether they are outdated. In particular, in step S7 of FIG. 5, it is checked whether a distance between the current location 1 at the time of execution of step S7 and the previous current location 1 at the time of execution of step S2, i.e., at the time when the database 201 was generated, exceeds a predefined threshold, e.g., remains smaller than the distance 110. Furthermore, it is checked whether a distance between the current location 1 and the outer boundary 101A of the first geographical area 101 falls below a certain predefined threshold. Furthermore, it is checked whether the distance between the current location and any one of the gateway road segments 2a-2g falls below a certain predefined threshold. Furthermore, it is checked whether a distance between a previously estimated cruising range 10 and the most recent cruising range 10 exceeds a certain threshold. It is also possible to determine whether the time since the generating of the database in step S2 and the execution of step S7 exceeds a certain threshold. Such criterions either alone or in any combination may be used as an indication that the database 201 has become outdated. Depending on the particular system layout and the particular demands, a combination or individual criterions may be used in order to trigger a new generation of the database in step S2.

If, in step S7, it is determined that the database is still valid, the method commences with step S4. Otherwise, the database is generated anew in step S2. It should be understood that it is possible to generate the database by executing step S2 in a background process. Then a foreground process may continue to execute the steps S4, S5, S6 using the old database, as long as the generating of the new database in step S2 is not completed.

Although the various embodiments have been shown and described with respect to certain preferred embodiments, equivalents and modifications will occur to others skilled in the art upon the reading and understanding of the specification. The one or more embodiments include all equivalents and modifications and is limited only by the scope of the appended claims. For example, the Figures have been discussed primarily with respect to an embodiment where the first road segment data, i.e., the road segment data for the initial routes, is retrieved from the database; in such a scenario, the road segment data is pre-generated at the time of the generating of the database according to various embodiments of the invention. However, it should be understood that it is also possible to not store the first road segment data, i.e., the route information for the initial routes in the database; rather it is possible to calculate this route information for the initial routes on-the-fly, i.e., at the time of execution of the method of estimating the ability of the vehicle to reach the target road segment.

Furthermore, for example the road network searches may be iteratively and repeatedly structures. For example, it may be possible to calculate with increasing accuracy, as long as calculation resources are available. For example, in various iterations of a road network search, certain hierarchy classes of roads may be neglected or included etc.

Although various examples of realizing the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Such modifications to the inventive concept are intended to be covered by the appended claims.

What is claimed is:

1. A method of estimating an ability of a vehicle to reach a target road segment, the method comprising:
    retrieving, by a computing device, digital map data comprising road segments in a vicinity of a current location of the vehicle, the digital map data comprising the target road segment;
    retrieving, by the computing device, road segment data for at least some of the road segments from a database, the road segment data containing previously generated route information for routes connecting the road segments, the route information parameterizing costs for travelling along the respective route;
    establishing, by the computing device, a current road segment based on a current location of the vehicle;
    establishing, by the computing device, from the retrieved road segment data, first road segment data for the target road segment, the first road segment data indicating a gateway road segment and indicating the route information for a successive route from the gateway road segment to the target road segment;
    determining, by the computing device, based on the route information for the successive route, first costs for travelling on the successive route;
    establishing, by the computing device, based on the indicated gateway road segment, second road segment data for the current road segment, the second road segment data indicating route information for an initial route from the current road segment to the gateway road segment;
    determining, by the computing device, based on the route information for the initial route, second costs for travelling on the initial route; and
    estimating, by the computing device, based on the determined first and second costs, the ability of the vehicle to reach the target road segment.

2. The method of claim 1, wherein the costs comprise parameterize energy consumption costs for travelling along the respective route or parameterize travel time costs for travelling along the respective route or a combination thereof.

3. The method of claim 2, wherein the second road segment data is established from the retrieved road segment data;
    wherein the establishing of the second road segment data comprises
    performing a road network search to obtain the initial route from the current road segment to the gateway road segment; and
    determining the route information for the initial route.

4. The method of claim 3, comprising:
    estimating the cruising range of the vehicle based on the estimated ability of the vehicle to reach the plurality of target road segments.

5. The method of claim 4, further comprising:
    determining the third geographical area having the inner boundaries being defined by a lower threshold of costs associated with reaching the inner boundaries and having outer boundaries being defined by an upper threshold of cost associated with reaching the outer boundaries.

6. The method of claim 4, wherein the third geographical area is indicated in the road segment data.

7. The method of claim 4, further comprising:
    checking a validity of the database, the validity indicating whether the routes of the route information are outdated, wherein the checking is based on elements selected from the group consisting of a distance between a location of the vehicle at the time the database was generated and the current location;
        a distance between gateway road segments and the current location; and
        a distance between a previously estimated cruising range and the estimated cruising range;
    wherein the method further comprises selectively generating a new database based on the checking of the validity.

8. The method of claim 7, wherein the new database is generated in a background process and the cruising range is estimated based on the database until the generating of the new database is completed.

9. A method of generating a database for estimating a cruising range of a vehicle, the method comprising:
    retrieving, by a computing device, digital map data comprising road segments from a map database in a vicinity of a current location of the vehicle;
    determining, by the computing device, based on the digital map data, a first geographical area and a second geographical area, wherein the first geographical area is a connected area comprising the current location, and wherein the second geographical area surrounds the first geographical area;
    determining, by the computing device, a plurality of gateway road segments based on their distance to the boundary between the first and second geographical areas;
    for at least one road segment situated in the first geographical area, performing, by the computing device, a road network search to obtain first routes from the respective road segments to each of the plurality of gateway road segments and buffering the obtained first routes as initial routes;

for each of the plurality of gateway road segments, continuing, by the computing device, the road network search to obtain second routes from the plurality of gateway road segments to at least one road segment situated in the second geographical area, and for the at least one road segment situated in the second geographical area, buffering, by the computing device, one of the obtained second routes as successive route, the successive route being the second route having minimized costs for travelling between any one of the plurality of gateway road segments and the respective at least one road segment situated in the second geographical area;

determining, by the computing device, route information for the buffered initial routes and successive routes, the route information parameterizing associated costs for travelling along the respective routes and indicating the respective gateway road segment associated with the respective route;

for the at least one road segment situated in the second geographical area, storing, by the computing device, in the database the determined route information for the buffered successive route as road segment data.

10. The method of claim 9, further comprising:

for the at least one road segment situated in the first geographical area, storing in the database the determined route information for the buffered initial routes as road segment data.

11. The method of claim 9, further comprising:

for each of the plurality of gateway road segments, performing a reverse road network search to obtain first routes for a plurality of road segments situated in the first geographical area to each of the plurality of gateway road segments and buffering the obtained first routes as initial routes; and for the plurality of road segments situated in the first geographical area, storing in the database the determined route information for the buffered successive routes as road segment data.

12. The method of claim 11, further comprising:

determining an approximated cruising range of the vehicle, wherein the determining of the first and second geographical areas is based on the approximated cruising range.

13. The method of claim 9, further comprising:

determining a third geographical area, the third geographical area being a fragment of the second geographical area and having inner boundaries being defined by a lower threshold of costs associated with reaching the inner boundaries and having outer boundaries being defined by an upper threshold of cost associated with reaching the outer boundaries, wherein the determined route information is buffered and/or stored for those road segments situated in the second and third geographical areas.

14. The method of claim 9, further comprising:

estimating a cruising range of the vehicle based on costs required for travelling along the road segments, wherein the determined route information is buffered and/or stored for those road segments situated in the second geographical area and which are situated in a proximity of the estimated cruising range.

15. A navigation system of a vehicle, the navigation system, comprising:

a positioning unit configured to determine a current location of the vehicle;

a map database comprising map data of road segments;

a database being configured to store road segment data for the road segments, the road segment data containing previously generated route information for routes connecting the road segments, the route information parameterizing costs associated for travelling along the respective route;

a processor configured to perform the steps of retrieving digital map data comprising road segments in a vicinity of a current location of the vehicle, the map data comprising the target road segment;

retrieving road segment data for at least some of the road segments from a database;

establishing a current road segment based on the current location of the vehicle;

establishing, from the retrieved road segment data, first road segment data for the target road segment, the first road segment data indicating a gateway road segment and indicating the route information for a successive route from the gateway road segment to the target road segment;

determining, based on the route information for the successive route, first costs for travelling on the successive route;

establishing, based on the indicated gateway road segment, second road segment data for the current road segment, the second road segment data indicating route information for an initial route from the current road segment to the gateway road segment;

determining, based on the route information for the initial route, second costs for travelling on the initial route; and estimating, based on the determined first and second costs, the ability of the vehicle to reach the target road segment.

* * * * *

UNITED STATES PATENT AND TRADEMARK OFFICE
CERTIFICATE OF CORRECTION

| | | |
|---|---|---|
| PATENT NO. | : 9,091,560 B2 | Page 1 of 1 |
| APPLICATION NO. | : 13/942228 | |
| DATED | : July 28, 2015 | |
| INVENTOR(S) | : Sebastian Kluge and Hans-Peter Engelhardt | |

It is certified that error appears in the above-identified patent and that said Letters Patent is hereby corrected as shown below:

In the Specification

Column 2
Line 29, please delete "faction" and insert -- fraction --

In the Claims

Column 26
Line 3, please delete "and/"

Signed and Sealed this
Fifteenth Day of December, 2015

Michelle K. Lee
*Director of the United States Patent and Trademark Office*